United States Patent [19]
Odell

[11] Patent Number: 5,879,125
[45] Date of Patent: Mar. 9, 1999

[54] BATTERY CHANGING SYSTEM

[75] Inventor: Michael S. Odell, Bluefield, W. Va.

[73] Assignee: Fairchild International Inc., Glen Lyn, Va.

[21] Appl. No.: 66,750

[22] Filed: Apr. 27, 1998

Related U.S. Application Data

[63] Continuation-in-part of Ser. No. 798,150, Feb. 10, 1997, Pat. No. 5,820,331.

[51] Int. Cl.$^6$ ...................................................... B62D 25/00
[52] U.S. Cl. ............................ 414/685; 414/458; 104/34; 180/685
[58] Field of Search ............................... 104/34; 180/685; 414/680, 685, 697, 722, 727, 729, 458, 346

[56] References Cited

U.S. PATENT DOCUMENTS

| | | |
|---|---|---|
| 5,163,537 | 11/1992 | Radev . |
| 5,275,525 | 1/1994 | Grumblatt . |
| 5,399,061 | 3/1995 | Grumblatt . |
| 5,598,083 | 1/1997 | Gaskins . |
| 5,664,932 | 9/1997 | Clonch et al. . |

*Primary Examiner*—Karen M. Young
*Assistant Examiner*—Gregory A. Morse
*Attorney, Agent, or Firm*—Pillsbury Madison & Sutro LLP

[57] ABSTRACT

A battery changing system in combination with a battery holder is provided. The battery changing system comprises a mobile frame, and a battery lift assembly including a pair of lifting arms forming an opening for receiving the battery holder. Mounting structure movably connects battery lift assembly to the mobile frame. Actuating structure moves the battery lift assembly between an initial position and an operative position wherein the battery holder is raised to a selected elevation above the ground. Elongated releasably lockable safety retaining structure is attached to the battery lift assembly. The battery holder is constructed and arranged to be received in the opening and includes first engaging structure. Each of the lifting arms includes an upwardly facing engaging surface. The upwardly facing engaging surfaces are positioned and configured such that upward movement of the battery lift assembly towards the operative position thereof causes the upwardly facing engaging surfaces of each lifting arm to engage the first engaging structure. The releasably lockable safety retaining structure is constructed and arranged to be releasably locked with the battery holder so as to extend forwardly from the battery lift assembly to the battery holder when the battery lift assembly is in the operative position thereof to thereby safely secure the battery holder to the battery lift assembly so that the battery holder is prevented from moving forwardly in the event that the mobile frame is violently jarred while moving forwardly down a sloped surface such that the battery holder is moved upwardly with respect to the lifting arms and the first engaging structure is moved out of engagement with the upwardly facing engaging surfaces.

28 Claims, 4 Drawing Sheets

BATTERY CHANGING SYSTEM

This is a Continuation-in-Part of: National Application Ser. No. 08/798,150 filed Feb. 10, 1997 now U.S. Pat. No. 5,820,331.

This invention relates to a system for moving a battery into and out of vehicles and equipment for use in underground mines, and more particularly, to an apparatus and method for lifting a battery holder or box containing an electric battery from ground level to an elevated position so as to transport the battery holder.

In underground mining operations, it is typical to provide electrically driven vehicles and electrically operated equipment with batteries as the electrical power supply. After a period of use, a spent battery must be replaced with a charged battery at the place of operation.

Battery changing systems for use in underground mines typically include a mobile vehicle having a low profile which is adapted for use in low overhead subterranean locations such as mine shafts. Electric motors are provided to propel the vehicle. The motors are powered by electric storage batteries which include a plurality of battery cells of substantial size and weight. Generally, these batteries are disposed in boxes which are supported in compartments built into the frame of the vehicle. Batteries contained in the boxes are electrically connected to the vehicle drive and control mechanisms. Since the batteries on the vehicle must be replaced when the electrical charge falls below the minimum required to supply the necessary power to the vehicles, typically, lift arms are pivotally mounted on the frame of the vehicle to lift the battery boxes out from the vehicle onto the ground where the lift arms are then disengaged. Spent batteries are then replaced with charged batteries contained in another holder, which is connected to the lift arms. The lift arms are raised so as to insert the charged batteries in the holder into the battery compartment.

Additionally, it is desirable to provide a battery changing system having means for safely securing the battery holder to the battery lift assembly in order to prevent the battery holder from moving forwardly with respect to the lift assembly. One battery changing system which does provide securing means is disclosed in U.S. Pat. No. 5,598,083. The '083 patent discloses a locking plate associated with the lower engagement recess which is activated to lock the lower engagement structure of the battery holder to the lower engagement recess. However, it is possible that an operator may try to engage and lift a battery holder while the locking plate is activated in its locked position, thereby preventing the lower engaging structure from entering the lower engaging recess and causing the lift assembly to move the battery holder in an unstable manner.

Thus, a need exists to provide an improved battery changing system and apparatus that is suitable for use in underground mines where limited lateral and overhead clearance is available for movement of the battery holder into an operative position and overcomes the problems associated with battery changing systems in the prior art.

It is an object of the invention to provide a battery changing system to fulfill the need referred to above. In accordance with the principles of the present invention, this objective is obtained by providing a battery changing system in combination with a battery holder. The battery changing system comprises a mobile frame constructed and arranged to move within a mine shaft, a battery lift assembly including a pair of lifting arms extending in spaced relation so as to form an opening for receiving the battery holder, mounting structure constructed and arranged to movably connect the battery lift assembly to the frame, and actuating structure extending between the battery lift assembly the frame. The battery changing system also includes releasably lockable safety structure attached to the battery lift assembly and constructed and arranged to be releasably locked with the battery holder.

The actuating structure is constructed and arranged to move the battery lift assembly between an initial position engaging the battery holder positioned on the ground and an operative position wherein the battery holder is raised to a selected elevation above the ground.

The battery holder is constructed and arranged to be received in the opening and includes first engaging structure. Each of the lifting arms includes an upwardly facing engaging surface. The upwardly facing engaging surfaces are positioned and configured such that upward movement of the battery lift assembly towards and into the operative position thereof causes the upwardly facing engaging surface of each lifting arm to engage the first engaging structure so that the battery holder can be stably moved with the battery lift assembly. Each of the lifting arms is constructed and arranged to limit forward movement of the battery holder with respect thereto when the battery lift assembly is in the operative position thereof and the battery changing system is moving forwardly down a sloped surface.

The releasably lockable safety structure is constructed and arranged to be releasably locked with the battery holder so as to extend forwardly between the battery lift assembly and the battery holder when the battery lift assembly is in the operative position thereof to thereby safely secure the battery holder to the battery lift assembly when in the operative position thereof so that the battery holder is prevented from moving forwardly with respect to the lifting arms of the battery lift assembly in the event that the mobile frame is violently jarred while moving forwardly down the sloped surface such that the battery holder is moved upwardly with respect to the lifting arms and the engaging structures are moved out of engagement with the engaging surfaces.

Another aspect of the present invention is a battery changing system in combination with a battery holder. The battery changing system comprises a mobile frame constructed and arranged to move the battery changing system within a mine shaft. A battery lift assembly includes a pair of lifting arms extending in spaced relation so as to form an opening for receiving the battery holder. Mounting structure is constructed and arranged to pivotally connect the battery lift assembly to the frame. Actuating structure extends between the battery lift assembly and the frame. The actuating structure is constructed and arranged to pivot the battery lift assembly between an initial position and an operative position wherein the battery holder is raised to a selected elevation above the ground.

The battery holder is constructed and arranged to be received in the opening and includes hanger structures fixed to opposing sidewalls thereof. Each of the hanger structures include a rearwardly extending wall defining a rearward edge, and a downwardly facing surface extending forwardly of the rearwardly extending wall. Each downwardly facing surface has a fulcrum edge. The battery holder including engaging structure at a lower rearward portion thereof.

Each of the lifting arms includes a forwardly facing surface disposed rearwardly of a forward end thereof, an upwardly facing surface disposed forwardly of the forwardly facing surface, and a downwardly facing surface on a rearward portion thereof, such that in the initial position of the battery lift assembly the forwardly facing surfaces engage with respective rearward edges of the rearwardly extending walls to initially interrelate the lifting arms with the battery holder. Upward pivotal movement of the battery lift assembly towards the operative position thereof causes the upwardly facing engaging surfaces of the lifting arms to engage the fulcrum edges of the hanger structures so that the battery holder is tilted relative to the upwardly facing engaging surfaces of the lifting arms until the upwardly facing surfaces of the lifting arms are engaged with the downwardly facing surfaces of the hanger structures and the downwardly facing engaging surfaces of the lifting arms are engaged with the engaging structure of the battery holder to thereby permit the battery holder to be stably moved with the mobile frame.

Each of the lifting arms are constructed and arranged to limit forward movement of the battery holder with respect thereto when the battery lift assembly is in the operative position thereof and the battery changing system is moving forwardly down a sloped surface. The battery lift assembly further comprises releasably lockable safety retaining structure constructed and arranged to be releasably locked with the battery holder when the battery lift assembly is in the operative position thereof to thereby safely secure the battery holder to the battery lift assembly so that the battery holder is prevented from moving forwardly with respect to the lifting arms of the battery lift assembly in the event that the battery changing system is violently jarred while moving forwardly down the sloped surface such that the battery holder is moved upwardly with respect to the lifting arms and the downwardly facing surfaces of the hanger structures are moved out of engagement with the upwardly facing engaging surfaces of the lifting arms.

Other objects, features and characteristics of the present invention, as well as the methods of operation and the functions of the related elements of the structure, and the combination of the parts and economics of manufacture, will become more apparent upon consideration of the following detailed description and appended claims with reference to the accompanying drawings, all of which form a part of this specification.

DETAILED DESCRIPTION OF THE PREFERRED EMBODIMENT

Referring to the drawings, there is shown a rear portion of a battery changing system in the form of a mobile vehicle, generally indicated at 10, for transporting an electrical storage battery (not shown) in a battery holder, generally indicated at 12. The vehicle may be, for example, of the type such as disclosed in U.S. Pat. No. 5,275,525, the content of which is hereby incorporated into the present specification by reference. The vehicle 10 includes a lift system, generally indicated at 14, which is pivotally mounted to the rear portion of the vehicle 10. Vehicle 10 is adapted for use in underground mining operations and the like where overhead and lateral clearance for raising and lowering the battery holder by the lift system 14 is minimal. The vehicle 10 includes a mobile frame 16 mounted on an axle assembly 18 which drives wheels 20 through a conventional transmission (not shown). The mobile frame 16 is constructed and arranged to be moved with a mine shaft.

The vehicle 10 may be provided with drive structure (not shown) for driving or propelling the vehicle, such as an electrically-powered drive motor connected to the storage battery positioned in the holder 12. It can be appreciated, however, that the vehicle 10 may be of the type to be pulled or towed by another vehicle which would receive electric power from the battery in the battery holder 12. The battery holder 12 has a box-like configuration and is constructed and arranged to receive and support a large electrical storage battery which may comprise a plurality of cell units. The battery has a capacity to supply electrical power to machinery for a selected period of time.

Figure 1:
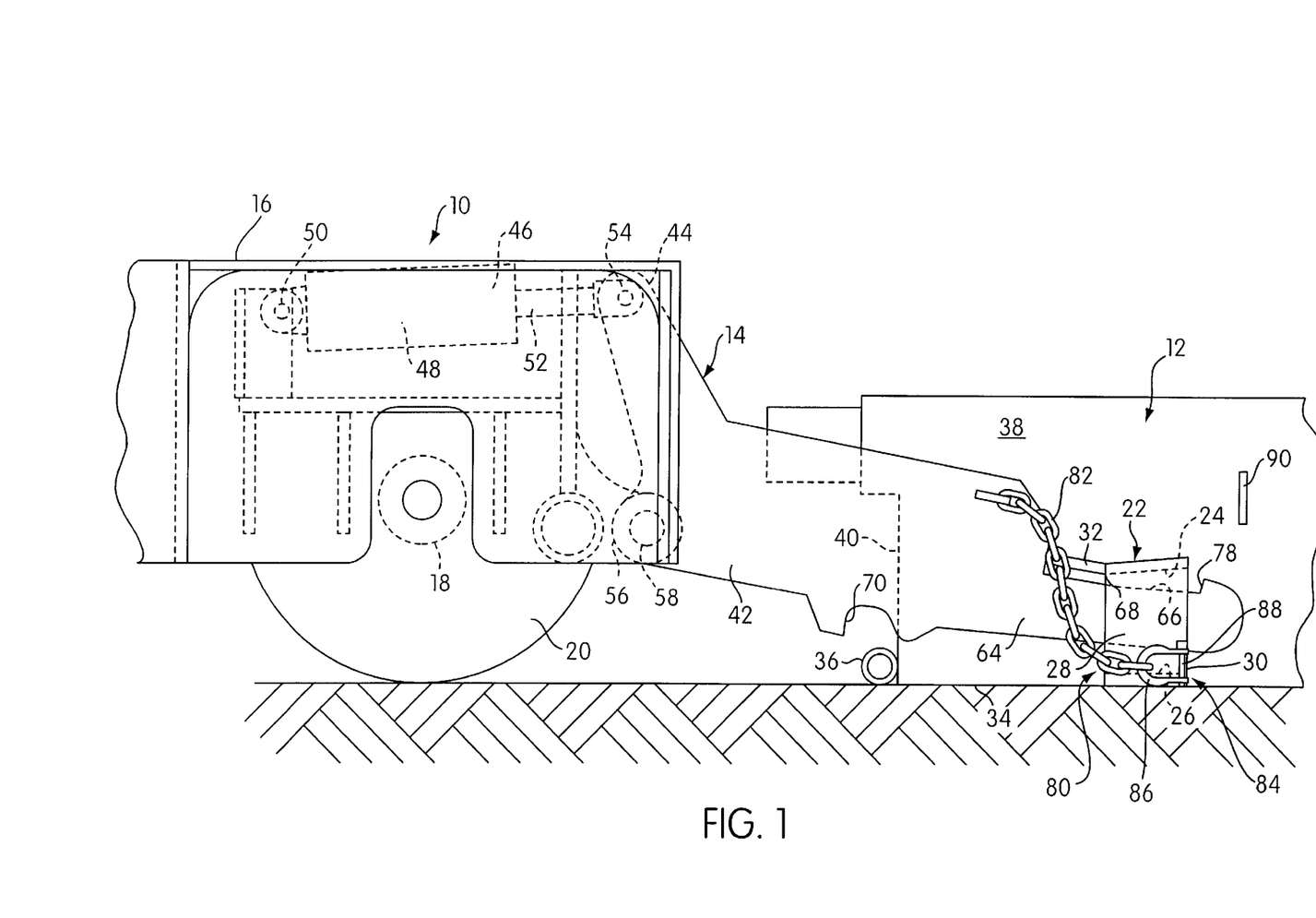
FIG. 1 is a schematic illustration in side elevation of a rear portion of a vehicle, illustrating a battery changing system provided in accordance with the principles of the present invention, shown in a tilted downward position so as to engage a battery holder positioned on the ground.
Figure 4:
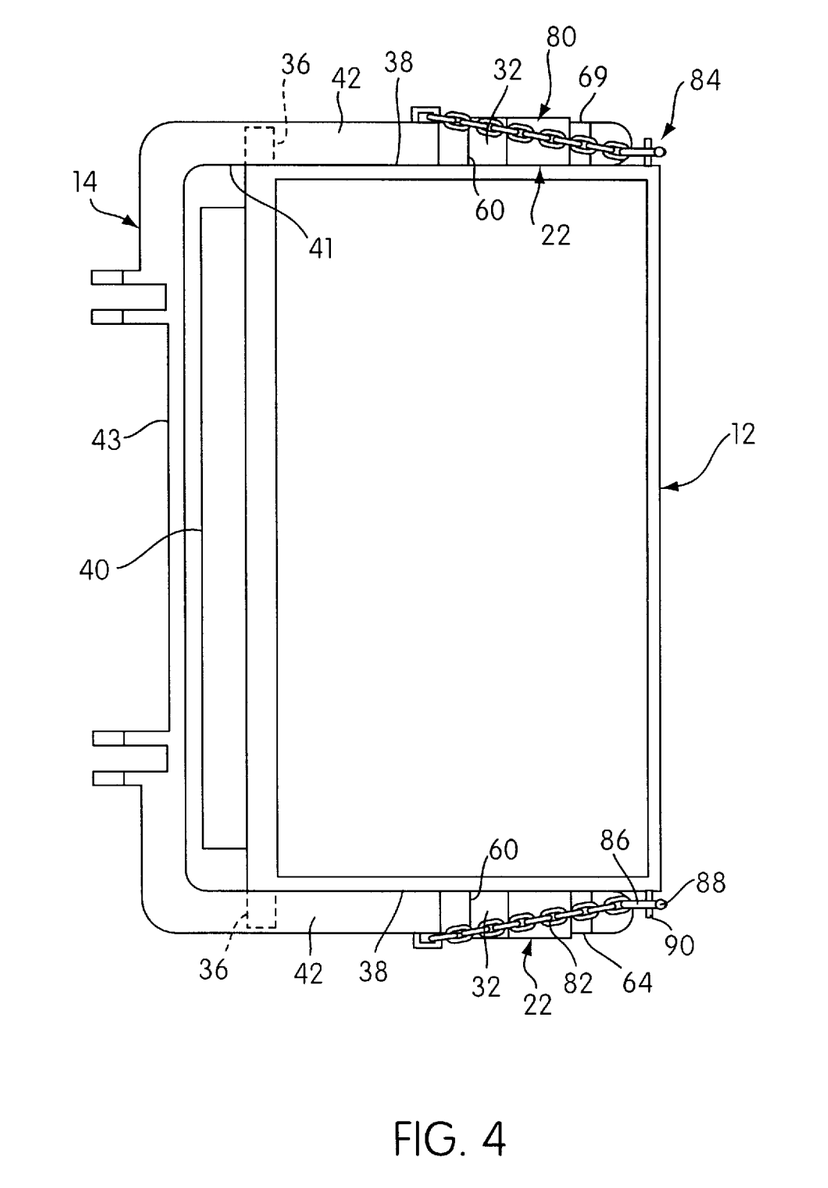
FIG. 4 is a schematic plan view of the lift assembly of the invention shown in an operative position with respect to a battery holder.

With reference to FIGS. 1 and 4, first engaging structure comprises a hanger structure in the form of a generally U-shaped hanger 22 is fixed to each side wall 38 of the battery holder 12. Each U-shaped hanger 22 is identical and includes a forwardly extending upper wall 24, a lower wall 26, and a connecting wall 28 joining the upper and lower walls so as to define a channel 30 between a side wall 38 of the battery holder 12 and the inner surfaces of the upper wall 24, lower wall 26 and connecting wall 28. An inclined wall 32 extends at an angle rearwardly from the upper wall 24 of each U-shaped hanger 22. Further, the underside of the upper wall 24 of each U-shaped hanger 22 inclines in a direction opposite the inclined wall 32, the function of which will become apparent below.

It is to be understood that the first engaging structure may take any form and is not limited to the hanger structure disclosed in this preferred embodiment. For example, the first engaging structure may comprise tubular members extending outwardly from the side walls of the battery holder as disclosed in U.S. Pat. Nos. 5,598,083 and 5,339,061, the entireties of which are hereby incorporated into the present application by reference.

As shown in FIGS. 1 and 4, a rearward portion 40 of the battery holder 12 adjacent the lower surface 34 thereof includes a tubular projection 36, defining second engaging structure, fixed thereto by welding or the like so as to extend outwardly beyond the extent of the side walls 38. The tubular projection 36 may extend the entire width of the battery holder 12, or it may be composed as two parts, each of which extends past the side walls 38 of the holder 12 so as to cooperate with each lift arm of the lift assembly 14, as will be explained below.

The lift assembly 14 includes a generally U-shaped frame of the type disclosed, for example, in U.S. Pat. No. 5,275,525, defining a configuration that is adapted to surround in close conformity to lateral side walls 38 and rear portion of the battery holder 12. Thus, as shown in FIG. 4, the lift assembly 14 includes a pair of lifting arms 42 disposed in spaced relation defining an opening 41 therebetween for receiving the battery holder 12. The arms 42 are connected to a support 43 to define the U-shaped frame. The arms 42 extend symmetrically about a longitudinal axis of the vehicle frame. It can be appreciated that the lifting arms 42 are constructed and arranged to provide sufficient rigidity to support the weight of the storage battery positioned in the battery holder 12.

The upper end portions 44 of each lifting arm 42 are connected to an associated piston-cylinder assembly, generally indicated at 46. Each piston-cylinder assembly 46 defines actuating structure and includes a cylinder 48 which is pivotally connected to a sidewall of the vehicle frame at connection 50. Each piston-cylinder assembly 46 also includes an extensible piston rod 52 which is mounted within the cylinder 48 so as to extend and retract upon actuation of the piston-cylinder assembly 46. Each piston rod 52 is connected by a pin connection 54 to the upper end 44 of the associated lift arm 42. A lower portion 56 of each lifting arm 42 is pivotally connected to the vehicle frame 16 via pin connection 58, the function of which will become apparent below. The pin connections 54 and 58 define mounting structure for pivotally connecting the lift assembly 14 to the frame 16.

Figure 2:
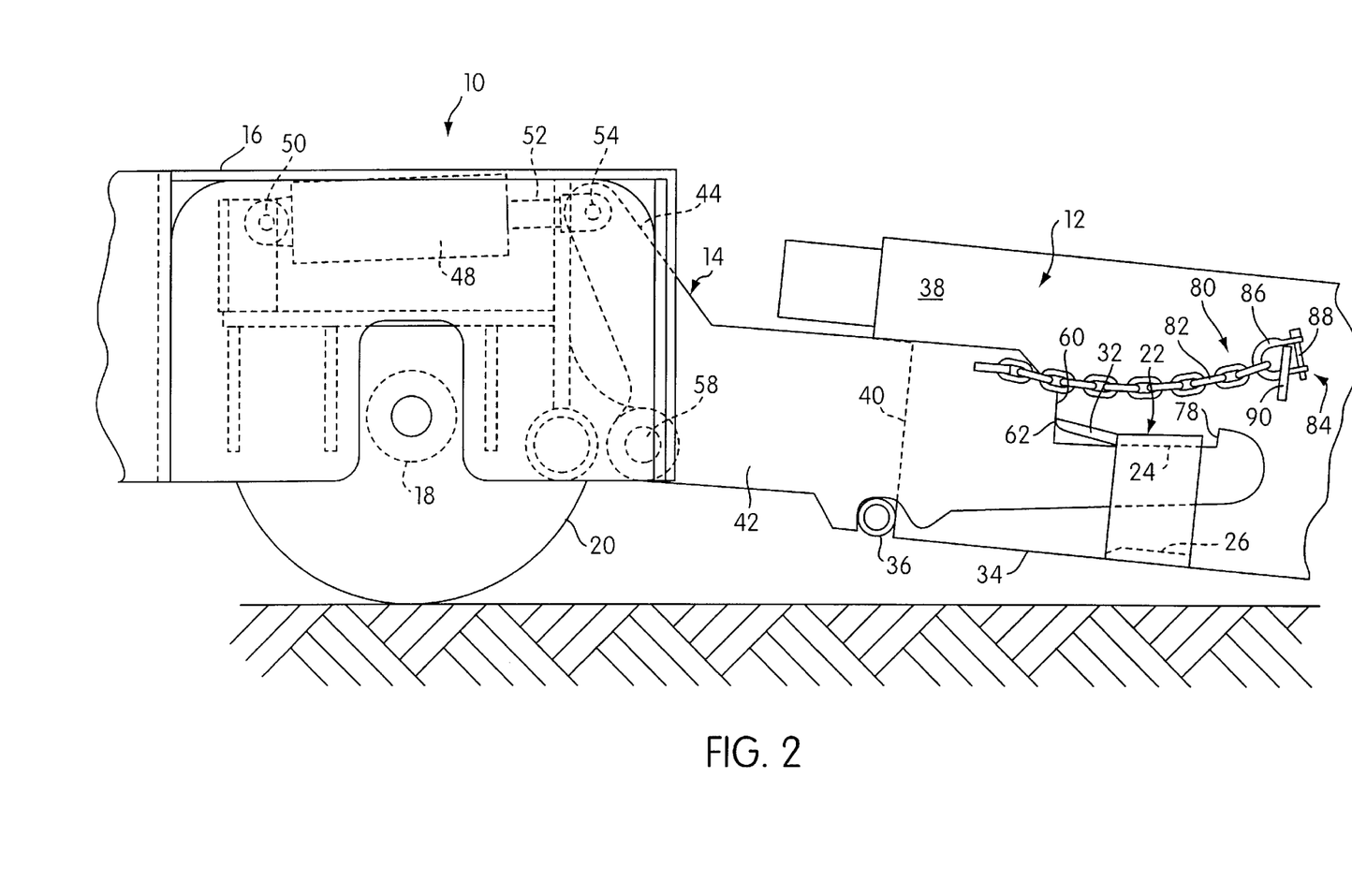
FIG. 2 is a view similar to FIG. 1, illustrating the initial lifting movement of the battery holder from the ground.
Figure 3:
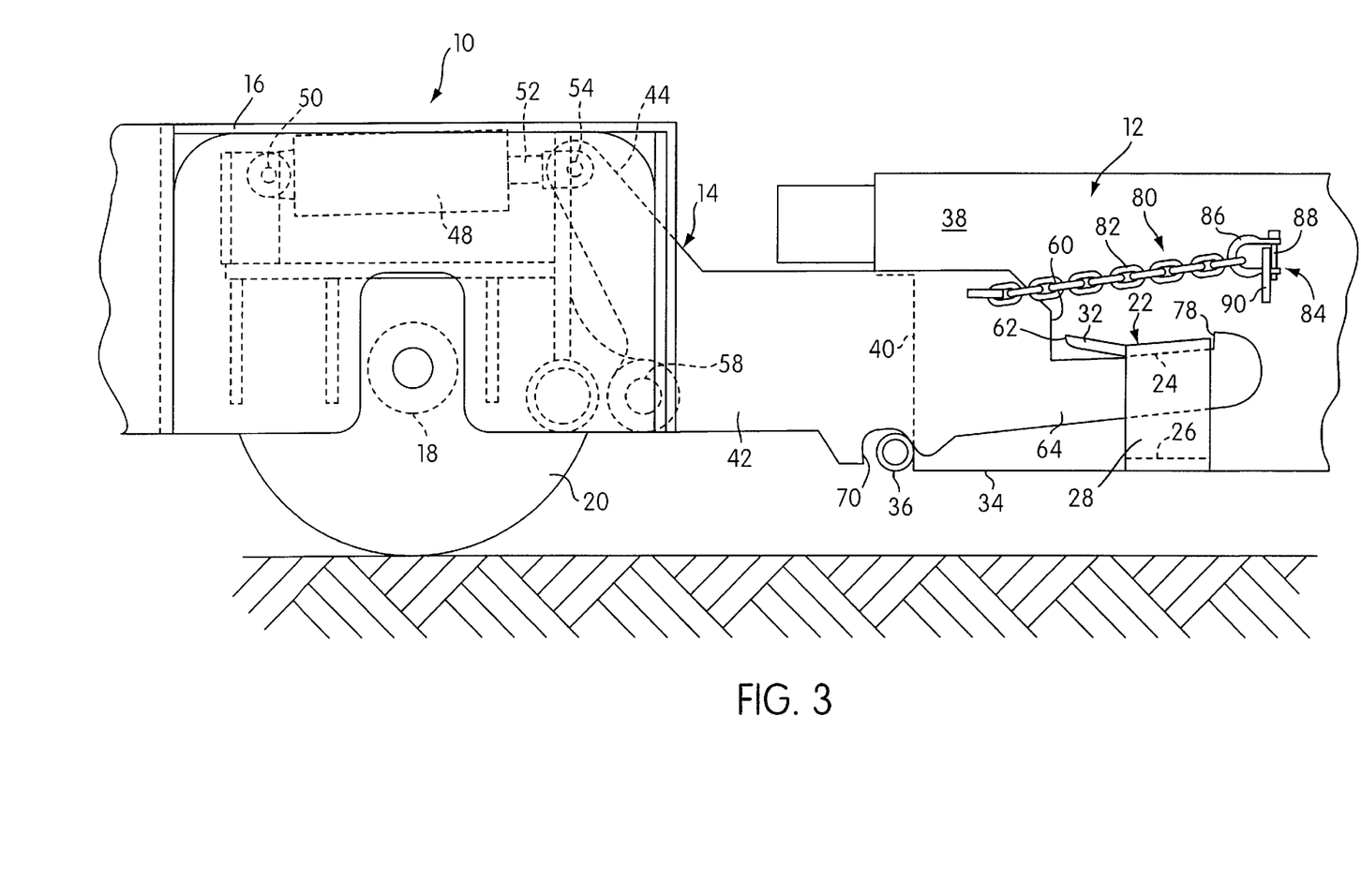
FIG. 3 is a view similar to FIGS. 1 and 2 illustrating the battery holder raised by a lift assembly from the ground to an operating position.

As shown in FIGS. 2 and 3, each lifting arm 42 includes a forwardly facing surface 60 disposed rearwardly of the forward end thereof, which is provided for engaging a rearward edge 62 of the inclined or rearwardly extending wall 32 of each U-shaped hanger 22. Disposed forwardly of the forwardly facing surface 60 is an elongated member 64 which is constructed and arranged to be received within the channel 30 defined by the U-shaped hanger 22. As best shown in FIG. 1, upon extension of the piston rods 52 from the cylinders 48, the arms 42 are pivoted about their lower connections 58 away from the vehicle frame 16 so as to lower the lift assembly 14. The vehicle is then advanced to a position such that the elongated members 64 are received in the channels 30 of the U-shaped hangers 22 and each forwardly facing surface 60 is engaged with the rearward edge 62 of the associated inclined wall 32. This engagement initially interrelates the lift arms 42 with the battery holder 12 in a predetermined position so that there will be no forward or rearward sliding movement taking place during the lifting of the arms 42.

It is to be noted that the present invention contemplates that the upwardly facing engaging surface 66 could simply be an upwardly facing recess adapted to engage a tubular member as shown in previously incorporated U.S. Pat. No. 5,598,083 and 5,399,061.

Once in this position, the piston-cylinder assemblies 46 are actuated so as to retract the piston rods 52 into the cylinders 48 which pivots the arms 42 about the lower connections 58 towards the vehicle frame 16. Upward pivotal movement of the lifting arms 42 causes the upwardly facing surface 66 of each elongated member 64 to engage a fulcrum edge 68 defined by the upper wall 24 of each U-shaped hanger 22. The position in which the fulcrum edge 68 engages the lift arms 42 is the same as the lift arms 42 continue to raise. However, a relative tilting movement between each upper wall 24 of the U-shaped hanger 22 and each lift arm 42 will take place until the fulcrum edge 68 of each upper wall of the U-shaped hangers engages the adjacent surface of each lift arm 42. When this occurs, the tubular projection 36 at the lower portion of the battery holder 12 engages with a downwardly facing surface defined by a generally U-shaped recess 70 in the lower rearward portion of each of the lifting arms 42. Further upward movement of the lifting assembly 14 (further retraction of the piston rods 52) simply results in the entire battery holder 12 being pivoted upwardly in a fixed relationship with respect to the lifting arms 42 until the lifting arms reach the operative position shown in FIG. 3.

As shown in FIGS. 1–3, once the elongated members 64 are disposed through the channels 30 of associated U-shaped hanger 22, the holder 12 can be locked with respect to the lifting arms via elongated releasably lockable safety structure 80. In the preferred embodiment safety structure 80 takes the form of a pair of chains 82 fixedly attached at one end thereof to the upper portion of each of the lifting arms 42. It is to be understood that other structures such as cables, rope, or rigid beams or bars may be used in place of the chains 82 in accordance with the present invention. Further, it is not necessary that the retaining structure be located on each side of the battery holder 12. It is contemplated that a single safety structure connecting, for example, the middle of the lift assembly 14 to the middle of the rearward wall 40 of the battery holder 12 could also be used. In addition, it is also contemplated that the retaining structure may encompass a locking plate such as that disclosed in the previously incorporated '083 patent when used in conjunction with the aforesaid hanger structures.

Each chain 82 has locking structure in the form of a locking element 84 on the end opposite the end attached to the lifting arm 42. The locking element 84 comprises a U-shaped component 86 having a pair of legs with pin-receiving bores formed therethrough and a locking pin 88. Both the locking pins 88 and the pin-receiving bores on the U-shaped component 86 are threaded so as to engage each other in a threadingly engaged relationship.

The battery holder 12 includes a U-shaped member 90 fixed to each side wall 38 so as to define a channel between each side wall 38 and U-shaped member 90. Each of the locking elements 84 engages with an associated U-shaped member 90 on the battery holder 12 in a releasably locked relation by inserting one of the legs of the U-shaped component 86 thereof into the channel defined by the associated U-shaped member 90 on the battery holder 12 and inserting the locking pin 88 through the pin-receiving openings formed through the legs of the U-shaped component 86. As can be seen from the drawings, the releasably lockable safety structure 80 is constructed and arranged to be releasably locked with the battery holder 12 so as to extend forwardly from the battery lift assembly 14 to the battery holder 12 when the battery lift assembly 14 is in the operative position thereof to thereby safely secure the battery holder 12 to the battery lift assembly 14 when in the operative position thereof.

It is preferable that the chains 82 are taut when the battery lift assembly 14 is in the operative position thereof. However, it is contemplated that some slack may be present in the chains 82 so long as the chains 82 still function to secure the batter holder 12 to the lift assembly 14. By providing such safety structure, the battery holder 12 is prevented from falling off the battery lift assembly 14 in the event that violent jarring motions occurring during travel over uneven, downwardly sloped surfaces such that the battery holder 12 is moved upwardly with respect to the lifting arms 42.

In addition, each of the elongated members 64 preferably terminates in a flange end defining a stop surface 78. With reference to FIG. 3, it can be appreciated that when the lift assembly 14 is in the operative position thereof, forward movement of holder 12 with respect to the arms 42 is limited since a portion of the U-shaped hanger will engage with the stop surfaces 78 thereby providing extra security in addition to the safety structure described above.

The lift assembly 14 is mounted on the vehicle frame 16 so as to raise and lower the battery holder 12 within the dimensional limits of the low profile of the vehicle frame 16. Thus, as shown in FIG. 3, in the operating position, the lift assembly 14 carries the battery holder 12 such that the top of battery holder 12 does not exceed the height dimension or the width dimensions of the low profile vehicle 10. With the compact construction of the holder 12 and the vehicle 10, the vehicle 10 with the lift assembly 14 and the battery holder 12 may be maneuvered within a mine to exchange batteries at any location in the mine where maneuverability is possible.

While the invention has been described in connection with what is presently considered to be the most practical and preferred embodiment, it is understood that the invention is not limited to the disclosed embodiment, but, on the contrary, is intended to cover various modifications and equivalent arrangements included within the spirit and scope of the appended claims.

What is claimed is:

1. A battery changing system in combination with a battery holder, the battery changing system comprising:

a mobile frame constructed and arranged to move said battery changing system within a mine shaft;

a battery lift assembly including a pair of lifting arms extending in spaced relation so as to form an opening for receiving the battery holder therebetween;

mounting structure movably connecting said battery lift assembly to said frame;

actuating structure extending between said battery lift assembly and said frame, said actuating structure being constructed and arranged to move said battery lift assembly between an initial position engaging the battery holder positioned on the ground and an operative position wherein the battery holder is raised to a selected elevation above the ground; and elongated releasably lockable safety retaining structure attached to said battery lift assembly, said elongated releasably lockable safety retaining structure being constructed and arranged to be releasably locked with said battery holder;

said battery holder being constructed and arranged to be received in said opening and including first engaging structure, each of said lifting arms including an upwardly facing engaging surface positioned and configured such that upward movement of said battery lift assembly toward and into said operative position thereof causes said upwardly facing engaging surface of each lifting arm to engage said first engaging structure so that said battery holder can be stably moved with said battery lift assembly, each of said lifting arms being constructed and arranged to limit forward movement of said battery holder with respect thereto when said battery assembly is in said operative position thereof and said battery changing system is moving forwardly down a sloped surface, said elongated releasably lockable safety retaining structure being constructed and arranged to be releasably locked with said battery holder so as to extend forwardly from said battery lift assembly to said battery holder when said battery lift assembly is in said operative position thereof to thereby safely secure said battery holder to said battery lift assembly so that said battery holder is prevented from moving forwardly with respect to said lifting arms of said battery lift assembly in the event that said mobile frame is violently jarred while moving forwardly down the sloped surface such that said battery holder is moved upwardly with respect to said lifting arms and said first engaging structure is moved out of engagement with said upwardly facing engaging surfaces.

2. The combination according to claim 1 wherein said battery holder includes second engaging structure disposed below and rearwardly of said first engaging structure, each of said lifting arms including a downwardly facing engaging surface disposed below and rearwardly of said upwardly facing engaging surfaces, said downwardly facing engaging surfaces being positioned and configured such that upward pivotal movement of said battery lift assembly toward and into said operative position thereof causes said downwardly facing engaging surfaces to engage said second engaging structure so that said battery holder can be stably moved with said battery lift assembly.

3. The combination according to claim 2, wherein said first engaging structure comprises hanger structures fixed to opposing side walls of said battery holder, each of said hanger structures including a rearwardly extending wall having a rearward edge, and a forwardly extending wall having a downwardly facing surface disposed forwardly of said rearwardly extending wall.

4. The combination according to claim 3 wherein said releasably lockable safety retaining structure comprises a pair of chains each having one end fixedly attached to an associated lifting arm and a locking element attached to an end of each chain opposite the one end attached to the associated lifting arm, said locking elements being releasably lockable with said battery holder when said battery lift assembly is in the operative position thereof.

5. The combination according to claim 4 wherein said battery holder further comprises a pair of U-shaped members attached to the opposing side walls of said battery holder so as to define a channel between each of said U-shaped members and an associated side wall of said battery holder, each of said locking elements attached to the ends of said chains comprising:

a generally U-shaped component having a pair of legs each with pin-receiving openings formed therethrough, and a locking pin adapted to be removably inserted through said pin-receiving openings, said locking elements being engageable with an associated U-shaped member on said battery holder in a releasably locked relation by removably inserting one of the legs of the U-shaped component thereof into the channel defined by the associated U-shaped member on said battery holder and removably inserting said locking pin through the pin-receiving openings formed through the legs of the U-shaped component.

6. The combination according to claim 5 wherein the pin-receiving openings formed through the legs of each U-shaped component are threaded and each of said locking pins is threaded such that said locking pins are threadingly engaged with said pin-receiving openings when releasably inserted therein.

7. The combination of claim 4, wherein said forwardly extending walls of said hanger structure have fulcrum edges and each of said upwardly facing engaging surfaces is disposed rearwardly of a forward end of each lifting arm and forwardly of a forwardly facing surface provided on each lifting arm such that in said initial position of said battery lift assembly said forwardly facing surfaces engage with respective rearward edges of said rearwardly extending walls to initially interrelate said lifting arms with said battery holder and upward pivotal movement of said battery lift assembly towards the operative position thereof causes said upwardly facing engaging surfaces of said lifting arms to engage said fulcrum edges of said hanger structures so that said battery holder is tilted relative to said upwardly facing engaging surfaces of said lifting arms about said fulcrum edges until said upwardly facing engaging surfaces are engaged with said downwardly facing surfaces of said forwardly extending walls of said hanger structures.

8. The combination according to claim 7 wherein said battery holder further comprises a pair of U-shaped members attached to opposing side walls thereof so as to define a channel between each of said U-shaped members and an associated side wall of said battery holder, each of said locking elements attached to the ends of said chains comprising:

a generally U-shaped component having a pair of legs each with pin-receiving openings formed therethrough, and a locking pin adapted to be removably inserted through said pin-receiving openings, said locking elements being engageable with an associated U-shaped member on said battery holder in a releasably locked relation by removably inserting one of the legs of the U-shaped component thereof into the channel defined by the associated U-shaped member on said battery holder and inserting said locking pin through the pin-receiving openings formed through the legs of the U-shaped component.

9. The combination according to claim 4 wherein said chains are taut when said battery lift assembly is in said operative position thereof to thereby limit forward movement of said battery holder.

10. The combination according to claim 4 wherein each of said hanger structures is a generally U-shaped hanger having said forwardly extending wall, a lower wall opposite said forwardly extending wall, and a connecting wall joining said forwardly extending and lower walls to thereby define a channel between each of the U-shaped hangers and an associated side wall of the battery holder.

11. The combination of claim 3, wherein said forwardly extending walls of said hanger structure have fulcrum edges and each of said upwardly facing engaging surfaces is disposed rearwardly of a forward end of each lifting arm and forwardly of a forwardly facing surface provided on each lifting arm such that in said initial position of said battery lift assembly said forwardly facing surfaces engage with respective rearward edges of said rearwardly extending walls to initially interrelate said lifting arms with said battery holder and upward pivotal movement of said battery lift assembly towards the operative position thereof causes said upwardly facing engaging surfaces of said lifting arms to engage said fulcrum edges of said hanger structures so that said battery holder is tilted relative to said upwardly facing engaging surfaces of said lifting arms about said fulcrum edges until said upwardly facing engaging surfaces are engaged with said downwardly facing surfaces of said forwardly extending walls of said hanger structures.

12. The combination according to claim 3 wherein each of said rearwardly extending walls extends at an upward inclination with respect to said downwardly facing surfaces of said forwardly extending walls.

13. The combination according to claim 3 wherein each of said hanger structures is a generally U-shaped hanger having said forwardly extending wall, a lower wall opposite said forwardly extending wall, and a connecting wall joining said forwardly extending and lower walls to thereby define a channel between each of the U-shaped hangers and an associated side wall of the battery holder.

14. The combination according to claim 3 wherein each of said lifting arms terminates in a flange end defining a stopping surface, said flange end being constructed and arranged such that when said lift assembly is in the operating position thereof, forward movement of said battery holder is limited as the forwardly extending walls of said hanger structures engage with associated stopping surfaces.

15. The combination according to claim 2 wherein said second engaging structure comprises a tubular member fixed to said lower rearward portion of said battery holder and extending beyond an extent of opposing side walls of said battery holder.

16. The combination according to claim 15 wherein each of said downwardly facing engaging surfaces of said lifting arms is a downwardly facing U-shaped recess.

17. The combination according to claim 1, wherein said releaseably lockable safety retaining structure comprises at least one elongated member having one end fixedly attached to an upper portion of said battery lift assembly and locking structure attached to an end opposite said one end attached to said battery lift assembly.

18. The combination according to claim 17, wherein said at least one elongated member comprises a pair of chains each having one end fixedly attached to an upper part of an associated lifting arm and said locking structure comprises locking elements attached to an end of each chain opposite the one end attached to the associated lifting arm.

19. The combination according to claim 18 wherein said battery holder further comprises a pair of U-shaped members attached to opposing side walls thereof so as to define a channel between each of said U-shaped members and an associated side wall of said battery holder, each of said locking elements attached to the ends of said chains comprising:

a generally U-shaped component having a pair of legs each with pin-receiving openings formed therethrough, and a locking pin adapted to be removably inserted through said pin-receiving openings, said locking elements being engageable with an associated U-shaped member on said battery holder in a releasably locked relation by removably inserting one of the legs of the U-shaped component thereof into the channel defined by the associated U-shaped member on said battery holder and inserting said locking pin through the pin-receiving openings formed through the legs of the U-shaped component.

20. The combination according to claim 19 wherein the pin-receiving openings formed through the legs of each U-shaped component are threaded and each of said locking pins is threaded such that said locking pins are threadingly engaged with said pin-receiving openings when releasably inserted therein.

21. The combination according to claim 18 wherein said chains are taut when said battery lift assembly is in said operative position thereof to thereby limit forward movement of said battery holder with respect to said battery lift assembly.

22. The combination according to claim 1 wherein said mounting structure includes pin connections between said mobile frame and said lift assembly.

23. The combination according to claim 1 wherein said actuating structure includes a piston-cylinder assembly constructed and arranged to pivotally move said lift assembly about said mounting structure.

24. A battery changing system in combination with a battery holder, the battery changing system comprising:

a mobile frame constructed and arranged to move said battery changing system within a mine shaft;

a battery lift assembly including a pair of lifting arms extending in spaced relation so as to form an opening for receiving the battery holder therebetween;

mounting structure constructed and arranged to pivotally connect said battery lift assembly to said frame; and actuating structure extending between said battery lift assembly and said frame, said actuating structure being constructed and arranged to pivot said battery lift assembly between an initial position and an operative position wherein the battery holder is raised to a selected elevation above the ground;

said battery holder being constructed and arranged to be received in said opening and including hanger structures fixed to opposing sidewalls thereof, each of said hanger structures including a rearwardly extending wall defining a rearward edge, and a downwardly facing surface extending forwardly of said rearwardly extending wall, said downwardly facing surface having a fulcrum edge, said battery holder including engaging structure at a lower rearward portion thereof, each of said lifting arms including a forwardly facing surface disposed rearwardly of a forward end thereof, an upwardly facing engaging surface disposed forwardly of the forwardly facing surface, and a downwardly facing engaging surface on a rearward portion thereof, such that in said initial position of said battery lift assembly said forwardly facing surfaces engage with respective rearward edges of said rearwardly extending walls to initially interrelate said lifting arms with said battery holder, upward pivotal movement of said battery lift assembly towards the operative position thereof causes said upwardly facing engaging surfaces of said lifting arms to engage said fulcrum edges of said hanger structures so that said battery holder is tilted relative to said upwardly facing engaging surfaces of said lifting arms until said upwardly facing engaging surfaces of said lifting arms are engaged with the downwardly facing surfaces of the hanger structures and the downwardly facing engaging surfaces of the lifting arms are engaged with the engaging structure of the battery holder to thereby permit the battery holder to be stably moved with the mobile frame, each of said lifting arms being constructed and arranged to limit forward movement of said battery holder with respect thereto when said battery lift assembly is in said operative position thereof and said battery changing system is moving forwardly down a sloped surface, said battery lift assembly further comprising releasably lockable safety retaining structure constructed and arranged to be releasably locked with said battery holder when said battery lift assembly is in the operative position thereof to thereby safely secure said battery holder to said battery lift assembly so that said battery holder is prevented from moving forwardly with respect to said lifting arms of said battery lift assembly in the event that said battery changing system is violently jarred while moving forwardly down the sloped surface such that said battery holder is moved upwardly with respect to said lifting arms and said downwardly facing surfaces of said hanger structures are moved out of engagement with said upwardly facing engaging surfaces of said lifting arms.

25. The combination according to claim 24, wherein said releasably lockable safety structure comprises a pair of chains each having one end fixedly attached to an upper part of an associated lifting arm and locking elements attached to an end of each chain opposite the one end attached to the associated lifting arm.

26. The combination according to claim 25 wherein said battery holder comprises a pair of U-shaped members attached to opposing side walls of said battery holder so as to define a channel between each of said U-shaped members and an associated side wall of said battery holder, each of said locking elements attached to the ends of said chains comprising:

a generally U-shaped component having a pair of legs each with pin-receiving openings formed therethrough, and a locking pin adapted to be removably inserted through said pin-receiving openings, said locking elements being constructed and arranged such that each of said locking elements engages with an associated U-shaped member on said battery holder in a releasably locked relation by inserting one of the legs of the U-shaped component thereof into the channel defined by the associated U-shaped member on said battery holder and removably inserting said locking pin through the pin-receiving openings formed through the legs of the U-shaped component.

27. The combination according to claim 24 wherein each of said rearwardly extending walls extends at an upward inclination with respect to said downwardly facing surfaces of said hanger structures.

28. The combination according to claim 24 wherein each of said hanger structures is a generally U-shaped hanger having an upper wall defining one of said downwardly facing surfaces, a lower wall opposite said upper wall, and a connecting wall joining said upper wall and lower wall to thereby define a channel between each of the U-shaped hangers and an associated sidewall of the battery holder.

* * * * *